Patented Mar. 31, 1936

2,035,601

UNITED STATES PATENT OFFICE 2,035,601

CAN SEALING COMPOUND AND THE LIKE

Julius H. Haines, Brooklyn, N. Y.

No Drawing. Application November 9, 1932, Serial No. 641,948

2 Claims. (Cl. 106—23)

The present invention relates to a new and useful composition of matter adapted particularly for use as a can sealing compound, in the manufacture of imitation leather, for impregnating paper, textiles, felt, etc., for compounding with asbestos for molding purposes, and for other similar and related purposes.

The novel composition of matter, according to the present invention, consists essentially of a rubber latex basis with which is associated a stabilizer in the form of a neutral continuously flowable unbreakable gummy and stringy product which is adapted to impart to the resulting mass the properties of coherence, strength, elasticity, plasticity and resistance to ageing, whereby the product is particularly adapted for use for the purposes hereinbefore outlined.

Can sealing compounds consisting essentially of rubber latex in association with fillers or the like are known. However, the known compositions have been found to be of little or no commercial value since, upon drying, loss of plasticity and strength, and consequent disintegration occur, rendering the material impotent to effect the desired function. Moreover, in general, they produce fermentation and, often, a disagreeable odor.

It has now been found that these several difficulties and disadvantages are obviated by incorporating with the latex, among other ingredients, a neutral stringy product of the character above-described adapted to overcome the aforesaid tendency to deterioration, disintegration, and the like.

The primary object of the present invention is the stabilization of latex compounds of the character hereinbefore set forth, as well as the improvement of the stringiness and elasticity thereof, without involving coagulation of the latex.

It is a further object of the invention to maintain and preserve the integrity of the rubber aggregates dispersed through the said compounds, and to keep the protective colloids, which may be present, together with the latex in unbroken continuity, whereby stabilization of the latex and superior ageing qualities are effected.

The combination of the various ingredients with latex, in accordance with the present invention, preserves the integrity of the dispersed latex rubber aggregates and retains the latex together with the protective colloids in an unbroken continuity of stringiness. Stringy neutral gum products, when compounded with latex and other materials, such as protective colloids, fillers and the like, stabilize latex, improve the stringy flowing characteristics of the product, render it immune to deterioration and coagulation when exposed to light, air or heat, and make it suitable for application by means of automatic nozzle or orifice machines or by hand-cans having attached nozzles or by roller or felt pad machines, and the like. Due to the special qualities of the products prepared in accordance with the present invention, deposition thereof in the grooves or joints of can-ends or the like results in the formation of a strong elastic and plastic film, which remains indefinitely in that state upon drying, and is therefore always ready to receive the body flange of the can, for instance, on an automatic seaming machine without curling, swelling or disintegrating, whereby an absolutely airtight and leakproof can results. Prior can sealing compounds involving latex in water emulsion have not been found to be practically satisfactory because they become tough, form heavy films and disintegrate under the conditions pointed out due primarily to disruption of the suspended rubber aggregates therein, whereby open spaces are left at the joints when the can is seamed, resulting in leaks and other obvious disadvantages.

The present invention distinguishes from the prior art, and especially from the patent to Hopkinson et al., No. 1,582,219, of which applicant is aware, by the inclusion of a stabilizing basis or bases consisting essentially of a neutral stringy product of the reaction between certain reagents hereinafter specified.

The process of this invention consists essentially of two steps, first, preparation of the stringy stabilizing medium, and secondly, incorporation thereof with rubber latex, which is usually in water emulsion. The presence of the stringy stabilizer positively prevents disintegration of the latex emulsion, upon drying thereof, by acting as an unbreakable link between the rubber aggregates.

Several forms of suitable stringy stabilizing mediums have been discovered. One preferred form thereof may conveniently be prepared by dissolving rosin or other resin, such as ester gum, in alcohol or other similar volatile solvent, and then saponifying the resultant solution by means of aqueous caustic soda or aqueous ammonia. A second preferred form may be prepared by converting a mixture of glycerin and boric acid into a neutral synthetic resinous mucoid and stringy product which is soluble in organic solvents and water, the conversion being preferably effected by heating the mixture at elevated temperature until the product attains the desired stringy character. The resinous product may then be dissolved in water, alcohol or other suitable organic solvent.

The stabilizing agent is admixed with fillers, adhesives, etc. in a colloid mill or otherwise and mixed with rubber latex from any suitable or desired source. The resultant product retains the latex in a form which is protected against coagulation, which is colloidal, creamy yet flowable, and uniformly stringy in character, and is particularly well adapted for use in sealing cans, and for similar and related uses.

Suitable fillers, coloring materials, auxiliary protective colloids, and the like, may be incorporated in the compound according to this invention, as will be apparent from the following specific illustrations thereof.

*Example*—Prepare a mixture (A) of the following:

| | Grams |
|---|---|
| Filler paste | 160 |
| Karaya gum solution (2-3%) | 25 |
| Glue | 10 |
| Glycerin | 15 |

Prepare a mixture (B) of the following:

| | |
|---|---|
| Ester gum solution in alcohol | 5 g. |
| (50 g. of gum per 100 cc. alcohol) | |
| Ammonia | 20 g. |
| Water | 100 cc. |

Heat (B) on water bath to dissolve lumps,—add 150 cc. of water and agitate vigorously.

Mix (A) and (B) and agitate to produce a uniform colloidal paste.

Incorporate the resultant paste with 175 g. of later, mixing slowly and thoroughly. Finally add 10 cc. of ammonia and a preservative. The product has the desired qualities of indefinite strength, stringiness, continuity and resistance to deterioration and disintegration which especially fit it for use as a can sealing compound. Fermentation and resultant disagreeable odors are substantially eliminated.

The filler paste used in (A) may comprise essentially kaolin, talc, bentonite, finely ground asbestos, red iron oxid, etc., or mixtures thereof.

The ester gum used in (B) is preferably extra pale, with an acid number which is practically nil.

The preferred latex is Havea latex (Havea Brasiliensis), either in relatively dilute (38-60% solids) or concentrated (70-75% solids) form. However, any other form or type of rubber-containing latex may be employed.

A preferred preservative is a small amount (½ to 1%) of a 25% glyco-borate solution. However, other preservatives may be used.

If desired, mixture (A) in the foregoing example may be entirely omitted without appreciably affecting the utility of the product for its intended purpose. The gum, glue and glycerin act as auxiliary agglutinants and protective colloids, supplementing the mucoid gummy and stringy product of mixture (B).

*Example II*—Prepare a mixture (C) of the following:

| | Grams |
|---|---|
| Kaolin paste | 75 |
| (1 g. kaolin per cc. water) | |
| Rosin | 5 |
| (1 g. rosin per cc. alcohol) | |
| Ammonia | 5 |

Prepare a mixture (D), similar to (C), except that, instead of the kaolin paste, use is made of a starch mixture prepared by pouring a mixture of 50 g. of starch and 50 cc. cold water into 150 cc. of hot water, while continuously stirring. Instead of starch, casein, gum tragacanth, albumin, glue, corn syrup, sodium silicate, crushed nut galls, gold size, gum arabic, or the like may be used.

Thoroughly and intimately admix mixtures (C) and (D), and then add a little (2 g.) of a 25% glycoborate solution and 3 g. of a glue solution (50 g. of glue per 200 g. of water).

Incorporate the resultant colloidal and stringy product with 75 g. of latex, and add 35 g. of a weak solution of elm bark.

While several illustrative embodiments of the invention have been described somewhat in detail, it is not intended to limit the scope of the invention thereby or otherwise than by the terms of the appended claims.

What is claimed is:

1. A can sealing composition comprising a basis of latex in intimate admixture with a neutral, continuously flowable, unbreakable, gummy and stringy synthetic resinous stabilizing medium adapted to impart indefinite stringiness to the product, said medium comprising a reaction product of glycerin and boric acid.

2. A synthetic stabilizing medium adapted particularly for use in imparting the properties of coherence and resistance to ageing to a compound consisting essentially of latex aggregates deposited from water emulsion, comprising a neutral continuously flowable substantially unbreakable gummy and stringy material, said medium consisting essentially of the reaction product between glycerin and boric acid.

JULIUS H. HAINES.